United States Patent Office

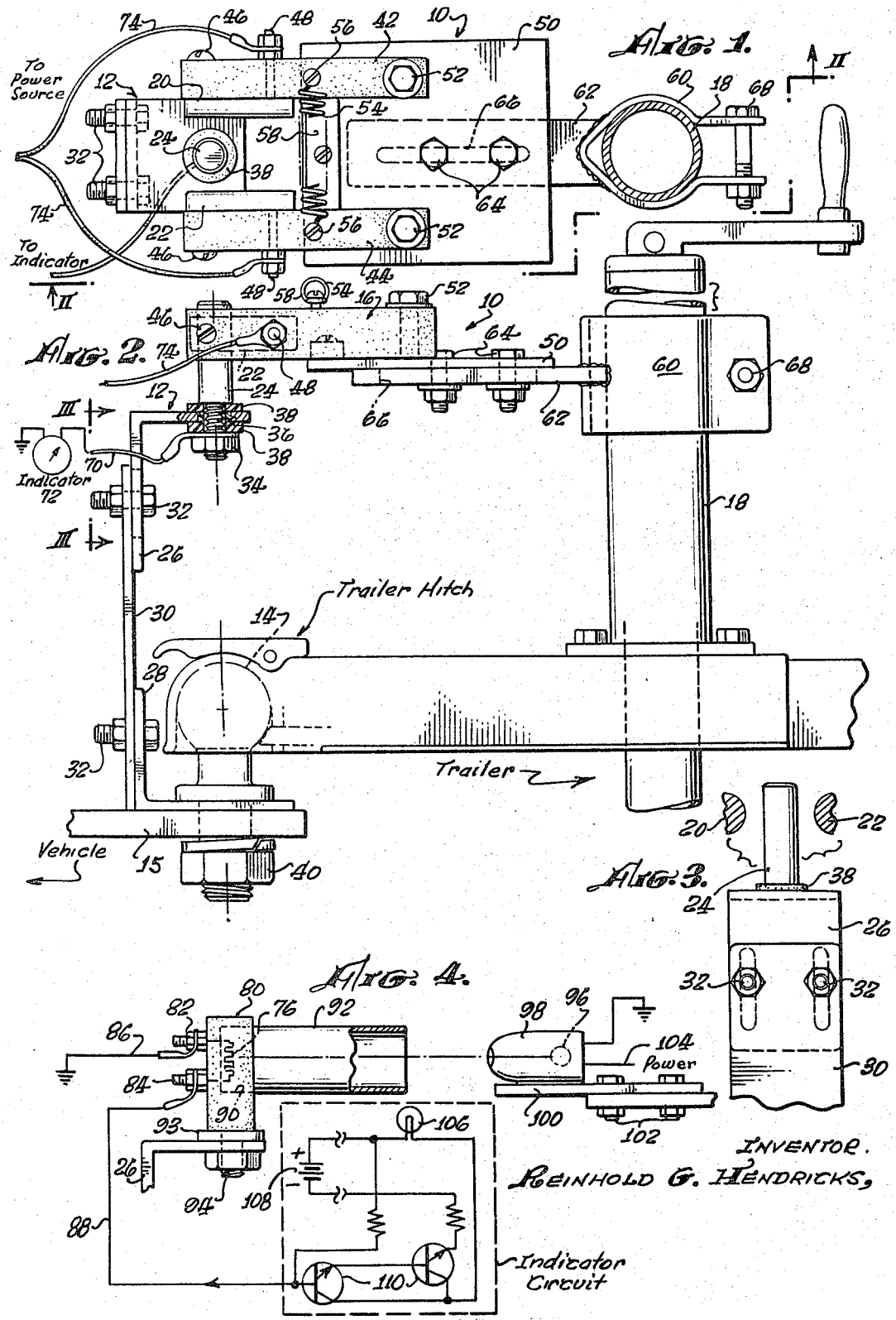

3,383,654
Patented May 14, 1968

3,383,654
FLATTENED TIRE INDICATOR
Reinhold G. Hendricks, 609 Tener Ave.,
Warren, Ariz. 85642
Filed July 26, 1965, Ser. No. 474,882
11 Claims. (Cl. 340—58)

ABSTRACT OF THE DISCLOSURE

The description discloses a flattened tire indicator for use with a vehicle which is pulling a trailer. The indicator may include a switch means which is divided into two portions, one portion being adapted to be mounted to the vehicle and the other portion being adapted to be mounted to the trailer. The switch portions are cooperable with one another between their mountings to function as a switch for operating in one condition when the trailer tires are inflated and operating in another condition when any of the tires are flattened. The switch may be connected to a light or buzzer for making positive indication to the vehicle operator. Simplicity has been obtained by mounting one portion of the switch substantially directly over the ball of the trailer hitch.

---

The present invention relates to a flattened tire indicator and more particularly to such an indicator which will indicate a flattened tire condition of a trailer which is being towed by a vehicle.

Within the past decade the trailer industry has been in a terrific boom and trailers have been sold to not only people traveling throughout the country but also to people who desire a luxury home in a particular location for an extended period of time. Some trailers are virtually "mobile homes" and are extendable in width to provide up to 1000 square feet of living area. With this way of living and vacationing it is not unusual to find a large number of trailers being pulled on the country's highways by automobiles and trucks of all sorts. The many operators of these vehicles, however are plagued with a very serious danger when any of the trailer tires become flat or flattened while the trailer is being pulled. The danger of a trailer tire becoming flat or flattened is its immediate heating which becomes so great due to the heavy loading and high friction that combustion of the tire occurs which sets the trailer on fire. Unfortunately the operator of a vehicle cannot sense a flattened tire indication on a trailer since the tilting and movement of the trailer due to the flattened tire condition is taken up by the ball type of connection at the trailer hitch. Under the present state of the art there is no satisfactory device for indication to the operator of the vehicle when such a flat tire condition occurs.

The present invention overcomes the aforementioned problem by providing an indicator which will indicate a flattened tire condition of a trailer to the operator of the towing vehicle. The flattened tire indicator may include a first signal means which is adapted to be mounted to the vehicle and a second signal means which is adapted to be mounted to the trailer. The first and second signal means are cooperable with one another to function as a switch which is capable of operating in one condition when the trailer tires are inflated and operating in another condition when any of the trailer tires are flattened. The switch may then be adapted to be connected to an indicator to indicate to the vehicle operator the flattened tire condition. In essence the invention amounts to adapting a switch means so that one portion thereof can be mounted on the vehicle and the other portion mounted on the trailer so that the two portions are cooperable with one another to function as a complete switch to switch on and off an indicator such as a buzzer or light within the proximity of the operator of the vehicle.

An object of the present invention is to provide an indicator which will indicate a flattened tire condition of a trailer which is being pulled be a vehicle.

Another object is to provide a simply constructed indicator which is extremely reliable in indicating a flattened tire condition of a trailer which is being pulled by a vehicle; and Other objects and many of the attendant advantages of the present invention will become better understood by reference to the following description and drawing wherein:

FIGURE 1 is a top plan view of the flattened tire indicator connected to the ball of the trailer hitch and to the jacking stand of the trailer;

FIGURE 2 is a side elevation view taken along plane II—II of FIGURE 1;

FIGURE 3 is a view taken along plane III—III of FIGURE 2; and

FIGURE 4 is a side elevation view of portions of a second embodiment of the present invention, which portions are adapted to be connected to a portion of the apparatus shown in FIGURES 1 and 2.

Referring now to the drawings there is shown in FIGURES 1 and 2 a flattened tire indicator 10 which includes a first signal means 12, which is connected to a ball 14 of a trailer hitch 15, and a second signal means 16, which is connected to a jacking stand 18 of a trailer (not shown).

The first and second signal means 12 and 16 are adapted to be mounted on the vehicle and trailer respectively so as to be cooperable with one another to function as a switch means for operating in one condition when the trailer tires are inflated and operating in another condition when any of these tires are flattened.

The second signal means 16 may include a pair of spaced apart elongated contacts 20 and 22 which are adapted to be spaced on opposite sides of the longitudinal axis of the vehicle and the trailer. The first signal means 12 may include a single elongated cylindrical contact 24 which is adapted to be received in a spaced relationship between the pair of contacts 20 and 22 so that when the contact 24 comes in contact with either of the contacts 20 and 22 an electrical connection is made. It is to be noted that in order to provide a spaced relationship between the cylindrical contact 24 and the contacts 20 and 22 the spacing between the pair of contacts 20 and 22 should be greater than the width or diameter of the contact 24. It should also be noted that this spaced relationship between the cylindrical contact and the pair of contacts 20 and 22 will be maintained constant regardless of the loading on the trailer because of the parallel relationship of the pair of contacts 20 and 22 with one another as well as with the longitudinal axis of the vehicle and the trailer.

It is important that the indicator 10 indicates a flattened tire condition on the trailer when the tire becomes flattened to such an extent that it may combust and set fire to the trailer. It is desirable that this indication occur only when the tire is flattened and that it not occur when the trailer is being pulled under normal conditions on the highway. An intermittent flashing on and off of the indicator would certainly be a psychological problem to the vehicle operator since this indication spells out "danger." The particular manner of mounting of the first and second signal means 12 and 16 to the vehicle and trailer respectively prevents the flattened tire indicator 10 from giving such false indications to the driver. This has been accomplished by mounting the cylindrical contact 24 directly above the ball 14 with its longitudinal axis in substantial alignment with a vertical diametric axis of the ball 14. In this manner when the vehicle rounds a corner the relative positional relationship of the cylindrical contact 24 with respect to the contacts 20 and 22 does not change.

As shown in FIGURES 1 and 2 the cylindrical contact 24 may be mounted to the vehicle by a channel which includes a pair of angle irons 26 and 28 which are connected to an upstanding flat bar 30 by bolts and nuts 32. As shown in FIGURE 3 the flat bar 30 may be provided with elongated vertical slots so that the height of the cylindrical contact 24 may be adjusted at various locations above the ball 14.

The cylindrical contact 24 may have a necked down threaded portion which extends through the top angle iron 26 with a nut 34 threaded thereon to hold the contact in the upstanding vertical position. Between the necked down threaded portion of the contact 24 and the angle iron 26 is an insulative sleeve 36. At the top and bottom of the angle iron 26 adjacent the larger portion of the cylindrical contact 24 and the nut 34 are insulative washers 38 for electrically insulating the contact 24 from the angle iron 26.

The bottom angle iron 28 is inserted between the ball 14 and the ball connector 15 with the bolt portion of the ball extending through the angle iron 28 and the ball connector 15 where it is tightened firmly in place by a nut 40. The holes in the angle irons 26 and 28 are substantially in alignment with one another so that the longitudinal axis of the cylindrical contact 24 is in substantial alignment with the vertical diametric axis of the ball 14.

The pair of elongated contacts 20 and 22 are connected to a pair of arms 42 and 44 respectively by bolts 46 and headless bolts 48, the headless bolts having nuts screwed thereon to serve as terminals. The arms 42 and 44 are constructed of an insulative material and are pivoted to a plate 50 by bolts and nuts 52. A spring 54 is connected between the arms 40 and 42 by bolts 56 so as to bias the arms toward one another. Bolted into the plate 50 is a spacer 58 which is located between the arms 42 and 44 so as to space each of the pair of contacts 20 and 22 a predetermined distance from the cylindrical contact 24. This predetermined distance is to be such that the contacts will engage one another when a trailer tire becomes dangerously flattened.

As shown in FIGURE 1 the spacer 58 positions the elongated contacts 20 and 22 in a parallel relationship with one another. In this manner the spaced relationship between the pair of contacts 20 and 22 with respect to the cylindrical contact 24 is not changed when the pair of contacts 20 and 22 are moved in a fore or aft relationship with respect to the contact 24. Because of the biasing action of the spring 54 the pair of contacts are maintained in this parallel relationship unless the cylindrical contact 24 puts a force on either of the pair of contacts 20 or 22, at which time the involved arm 40 or 42 will pivot to relieve pressure which may otherwise damage the components.

The plate 50 is connected to the jacking stand 18 by a bracket 60 and a fore and aft extending tongue 62, the bracket 60 and the arm 62 being connected to one another. The plate 50 may rest on the tongue 62 and may be connected thereto by a pair of bolts and nuts 64. The tongue 62 may be provided with an elongated fore and aft extending slot 66 for receiving the bolts 64 so that the plate 50 may be adjusted in a fore and aft direction with respect to the trailer. The bracket 60 may partially encompass the jacking stand 18 and may be secured in a vertical direction therealong by a bolt and nut 68. It is to be noted that the adjustments at the bracket 60, the plate 50 on the bracket 62 and the angle iron 26 on the flat bar 30 enable the cylindrical contact 24 to be placed in the most desirable position with respect to the pair of contacts 20 and 22.

The bolt 34, which is threaded on the necked down portion of the cylindrical contact 24, provides an excellent terminal for the contact 24. Connected to that terminal is an electrical lead 70 which is connected to an indicator 72. The indicator 72 may be a light or buzzer which is located in a vehicle and within the proximity of the driver. One side of the indicator 72 is shown grounded.

Connected to the terminals 48 are shown a pair of hot wires or leads 74 which are connected to a power source (not shown) so as to energize the pair of contacts 20 and 22. Accordingly, when the cylindrical contact 24 contacts either of the pair of contacts 20 or 22 a current is supplied to the cylindrical contact 24 for operating the indicator 72. Such an operation will warn the driver of the vehicle of a flattened tire condition. For instance, should a right tire of a trailer become flattened the contact 22 will contact the cylindrical contact 24 to warn the driver of this condition or should a left tire of the trailer become flattened the contact 20 will contact the cylindrical contact 24 to give the same indication.

It is to be understood that when a tire becomes flattened on a two wheel trailer the tilting of the trailer will be more pronounced than with a four wheel trailer. Accordingly, the spacing between the cylindrical contact 24 and the pair of contacts 20 and 22 should be designed according to the type of trailer being towed.

FIGURE 4 illustrates another embodiment of the present invention. This embodiment includes a photoelectric cell 76 which is mounted within an insulative housing 80 so that the cell 76 can see in an aft direction toward the trailer. Extending through the housing 80 and connected to the photoelectric cell 76 are a pair of terminals 82 and 84, the terminal 82 being connected to ground by a lead 86 and the terminal 84 being connected to a lead 88 which goes to an indicator circuit. Frictionally mounted within a bore 90 of the housing 80 is an elongated tubular shield 92 for protecting the photoelectric cell 76 from ambient light conditions. The insulative housing 80 is mounted to a plate 93 by any suitable means such as bending or screws, and extending downwardly from the plate 93 is a threaded portion 94. The threaded portion 94 is adapted to extend through the horizontal hole of the angle iron 26 so as to complete a first signal means.

A light source such as a light bulb 96 is mounted aft of the photoelectric cell 76 within a housing 98 for directing a light beam through the tube 92 onto the photoelectric cell 76. The housing 98 is mounted on a plate 100 which has a pair of bolts and nuts 102 extending therethrough. These bolts and nuts 102 are adapted to extend through the slot 66 in the tongue 62 so as to complete a second signal means and enable the light 96 to be mounted on the jacking stand 18 of the trailer. When all of the tires on the trailer are in an inflated condition it is desirable that the photocell 76 and the light 96 be positioned so that the light impinges upon the photoelectric cell. One side of the light bulb 96 is connected to ground and the other side is connected to a power source (not shown) by a lead 104. It is to be noted that the photocell 76 and the light 96 could still carry out their functions if reversed in their positions on the vehicle and the trailer.

As shown in FIGURE 4 the indicator circuit includes an indicator 106 which may be a light or buzzer. The indicator 106 receives its power from a power source 108 only when the light 96 is directed off of the photoelectric cell 76, at which time the photocell no longer feeds a signal through lead 88. This is accomplished by a pair of transistors 110 which will allow current to flow to the indicator 106 only when they are in an unbiased state. When a signal is fed through lead 88 to the transistors 110 the light 96 is directed on the photocells 76, the tires on the trailer are inflated and the indicator 106 will be off. A movement of the light 96 away from the photocell 76 will turn the indicator 106 on.

It is now readily apparent that the present invention provides a novel arrangement of components for indicating to the driver of a vehicle a flattened tire condition of a trailer. The structure and operation of the invention has been simplified by utilizing a switch principle and mounting a portion of the switch on the vehicle and the remainder of the switch on the trailer so that the portions are cooperable with one another to indicate any flattened tire condition. By mounting the switch components in a particular manner any false indications will be avoided.

Obviously many modifications and variations of the present invention are possible in the light of the above teachings. It is therefore to be understood that within the scope of the appended claims the invention may be practiced otherwise than as specifically described.

I claim:

1. A flattened tire indicator for use with a vehicle pulling a trailer, the vehicle having a trailer hitch ball and the trailer having a jackstand, said indicator comprising:
a switch means including first and second signal means;
(a) said first signal means adapted to be mounted to said vehicle;
(b) said second signal means adapted to be mounted to said trailer;
said first and second signal means being cooperable with one another between their mountings to function as a switch for operating in one condition when the trailer tires are inflated and operating in another condition when any of said tires are flattened;
said switch means being adapted to be connected to an indicator for indicating to the vehicle operator a flattened tire condtion; and
said first signal means is adapted to be connected substantially directly over the ball of the trailer hitch.

2. A flattened tire indicator as claimed in claim 1 wherein:
said second signal means is adapted to be connected to said jackstand.

3. A flattened tire indicator as claimed in claim 1 wherein:
each signal means includes at least one electrical contact.

4. A flattened tire indicator as claimed in claim 3 wherein:
one of the signal means includes a pair of spaced apart contacts which are adapted to be spaced on opposite sides of the longitudinal axis of the vehicle and trailer and
the other signal means includes one contact which is adapted to be received between said pair of contacts.

5. A flattened tire indicator as claimed in claim 4 wherein:
the one signal means with the pair of contacts is said second signal means and
the other signal means with the one contact is said first signal means.

6. A flattened tire indicator for use with a vehicle pulling a trailer comprising:
a first signal means adapted to be mounted to said vehicle;
a second signal means adapted to be mounted to said trailer;
one of said signal means includes a light means and the other signal means includes a photoelectric cell which is adapted to be responsive to said light means;
said first and second signal means being cooperable with one another to function as a switch means for operating in one condition when the trailer tires are inflated and operating in another condition when any of said tires are flattened; and
said switch means being adapted to be connected to an indicator for indicating to the vehicle operator a flattened tire condition.

7. A flattened tire indicator as claimed in claim 6 wherein:
the light from said light means is adapted to be directed on said photoelectric cell when the vehicle and trailer tires are inflated and is adapted to be directed off of said photoelectric cell when said tires are flattened.

8. A flattened tire indicator as claimed in claim 7 including:
circuit means connected to said photoelectric cell and adapted to be connected to an indicator for switching the indicator on when the light of the light means is directed off of the photoelectric cell and switching the indicator off when the light of the light means is directed on the photoelectric cell.

9. A flattened tire indicator for use with a vehicle pulling a trailer, the vehicle having a trailer hitch ball and the trailer having a jackstand, said indicator comprising:
an elongated electrical contact;
means adapted to be connected to said ball hitch on the vehicle for positioning the contact above the ball with the longitudinal axis of the contact in substantial alignment with a vertical diametric axis of said ball;
a pair of elongated electrical contacts which are spaced apart further than the width of the first mentioned contact;
means adapted to be connected to said jacking stand on the trailer for positioning the pair of contacts in the spaced apart relationship with one on each side of the first mentioned contact and with their longitudinal axes substantially parallel to the longitudinal axis of the trailer so that when a trailer tire becomes flattened the first mentioned contact will contact one of said pair of contacts; and
said contacts being adapted to be connected to an indicator and a power source for actuating the indicator when the first mentioned contact makes contact with one of said pair of contacts.

10. A flattened tire indicator as claimed in claim 9 wherein:
a trailer end of each of the pair of contacts is pivotally connected to its positioning means;
spring means biasing said pair of contacts toward one another; and a spacer connected to the positioning means and located between the pair of contacts for maintaining their spaced relationship.

11. A flattened tire indicator as claimed in claim 9 wherein:
the first mentioned positioning means is selectively adjustable in a substantially vertical direction and the second mentioned positioning means is selectively adjustable in a substantially horizontal direction.

References Cited

UNITED STATES PATENTS

| | | | |
|---|---|---|---|
| 2,469,931 | 5/1949 | Pratt | 340—58 XR |
| 2,546,183 | 3/1951 | Foulks | 340—58 XR |
| 2,727,221 | 12/1955 | Sprigg | 340—58 |
| 2,957,058 | 10/1960 | Trott | 340—58 XR |
| 2,990,536 | 6/1961 | Pace | 340—58 |

JOHN W. CALDWELL, *Primary Examiner.*

ALVIN H. WARING, *Examiner.*